United States Patent
Ribak et al.

(10) Patent No.: US 7,176,931 B2
(45) Date of Patent: Feb. 13, 2007

(54) MODIFYING HYPERLINK DISPLAY CHARACTERISTICS

(75) Inventors: Amnon Ribak, D.N. Misgav (IL); Alan Wecker, D.N. Misgav (IL); Michal Jacovi, D.N. Misgav (IL); Vladmir Soroka, Carmiel (IL)

(73) Assignee: International Business Machines Corporation, Armonk, NY (US)

( * ) Notice: Subject to any disclaimer, the term of this patent is extended or adjusted under 35 U.S.C. 154(b) by 914 days.

(21) Appl. No.: 09/927,345

(22) Filed: Aug. 13, 2001

(65) Prior Publication Data

US 2003/0030645 A1 Feb. 13, 2003

(51) Int. Cl.
*G09G 5/00* (2006.01)

(52) U.S. Cl. .................. 345/581; 345/738; 345/760

(58) Field of Classification Search ............ 345/581, 345/738, 760
See application file for complete search history.

(56) References Cited

U.S. PATENT DOCUMENTS

| | | | |
|---|---|---|---|
| 5,572,643 A | 11/1996 | Judson | |
| 5,708,825 A | 1/1998 | Sotomayor | |
| 5,805,815 A | 9/1998 | Hill | |
| 5,809,317 A | 9/1998 | Kogan et al. | |
| 6,037,934 A | 3/2000 | Himmel et al. | |
| 2002/0138555 A1* | 9/2002 | Yu | 709/203 |
| 2003/0014530 A1* | 1/2003 | Bodin et al. | 709/231 |

FOREIGN PATENT DOCUMENTS

| | | |
|---|---|---|
| EP | 0 817 107 A3 | 2/1999 |
| JP | 2000-113068 * | 4/2000 |

OTHER PUBLICATIONS

Dick Oliver, 1999, A Division of Macmillan Computer Publishing, Fourth Edition, pp. 72-75, 87, 88.*
Dick Oliver, Sams teach yourself HTML 4 in 24 Hrs, pp. 73, 74, 75, 87, 88.*
Barrett et al., "How to Personalize the Web", *Proceedings of the Conference on Human Factors in Computing Systems CHI*, 1997, ACM Press, New York.
Stanyer et al., "Improving Web Usability with the Link Lens", Presented at the Eighth InternationalWorld Wide Web Conference, May 1999, Elsevier Science B.V., Toronto.
Fabio Arciniegas A., "What is Xlink?", published on xml.com, 2000, (available at: http://www.xml.com/pub/a/2000/9/xlink/index.html.
http://www.richlink.com, 2000.

* cited by examiner

*Primary Examiner*—Kee M. Tung
*Assistant Examiner*—Tam Tran
(74) *Attorney, Agent, or Firm*—Browdy and Neimark, PLLC

(57) ABSTRACT

A method for visualizing data includes receiving code representing content for display on the screen of a computer, the content including at least one hyperlink to other content and at least one attribute associated with the hyperlink. User preferences are set for each attribute. The content is displayed on the screen, and at least one of the hyperlinks is hidden in response to the combination of user preference for that attribute.

36 Claims, 4 Drawing Sheets

MODIFYING HYPERLINK DISPLAY CHARACTERISTICS

FIELD OF THE INVENTION

The present invention relates generally to methods and systems for formatting information stored in markup language form, and specifically to methods and systems for augmenting hypertext links with information about the target of those links, and for controlling the extent to which this information is displayed.

BACKGROUND OF THE INVENTION

Hyperlinks are widely used in documents of all types, and in particular in Internet documents, to provide easy access to additional information. The hyperlinks can provide access not only to other documents or Universal Resource Locators (URLs) but also to pop-up boxes with translations, audio pronunciation, image or video description and other sources of information directly related to the highlighted text.

Visual formatting cues such as text color, background color, font, or font characteristics are used to distinguish a hyperlink from its surrounding text. Information associated with the hyperlink, hidden from the user, provides the formatting information for the hyperlink. In standard markup language practice, the formatting information is not directly provided for each hyperlink separately. Each hyperlink is assigned a style attribute. In HTML (hypertext markup language) documents, the particular formatting used for a style is typically defined in separate "style sheet" documents. The style sheet defines a basic, default formatting style, and then defines a tree hierarchy of additional formatting styles. The default style is at the root of the tree, and each of the leaves represents a specific child style. Branching points within the tree define families of formatting styles.

Formatting for Extended Markup Language (XML) documents is specified in a separate style sheet written in Extensible Style Sheet Language (XSL). XSL style sheets contain formatting information, and also include rules for translating elements from XML to other formats according to the Extensible Style Sheet Language Transformation (XSLT) standard. A particular XSL document may specify the conversion of a XML document to HTML, while another can specify the conversion of the XML document into an address book application database.

Emerging technologies expand the definition of hyperlinks and style attributes to allow one-to-many links. A particular XML element can be linked to many other elements. Clicking on the hyperlink opens a pop-up list of resources associated with the link. Richlink (see www.richlink.com) markets such a system for use by content authors. Clicking on a Richlink hyperlink displays another HTML page in a smaller window, complete with images, text, and more hyperlinks. Xlink (see www.w3c.org/xlink), a markup-language specification that has been adopted by the World Wide Web Consortium (W3C), provides a standardized method of specifying the one-to-many relationships utilizing beginning points, end points and arcs.

Although hyperlinks enrich the content of a document, they can also interfere with the natural cadence of user interaction with the document. At each link the user must decide whether to pursue the hyperlink or ignore it. Documents that use one-to-many hyperlinks further distract the user by displaying a multitude of resources associated with a hyperlink concept in the document. The situation is exacerbated by certain systems that automatically annotate text by converting almost any phrase in it to a hyperlink, and by linking one phrase in the text to more than one target.

The prior art contains various methods and systems for dynamically adding link content to Web pages and other documents. Systems and methods also exist to dynamically modify link characteristics, adding icons or changing link colors and fonts.

One such method is described by Barrett et al., in "How to Personalize the Web," published in the *Proceedings of the Conference on Human Factors in Computing Systems CHI '97* (ACM Press, New York, 1997), which is incorporated herein by reference. The authors describe a system called Web Browser Intelligence (WBI), which organizes agents on a user's workstation to perform functions that include modifying Web documents to provide additional information to the user. One agent function is to annotate hyperlinks with network speed information, using what the authors call "Web traffic lights." For each of the hyperlinks on a given Web page, a generator agent maintains and updates a database of network delays to the respective server to which the hyperlink leads. An editor agent adds small in-line images around each of the hyperlinks appearing on the page, which are displayed as colored dots that indicate the speed of the corresponding network link. The traffic lights thus give the user an indication of the delay to be expected if one or another of the hyperlinks is selected.

Another approach is described by Stanyer et al., in "Improving Web Usability with the Link Lens," presented at the Eighth International World Wide Web Conference (Toronto, May, 1999, proceedings published by Elsevier Science B. V.). The authors' "Link Lens" presents the user with meta-data regarding documents that are available for download over various links. The meta-data include a predicted transfer time for the document, based on the size of the document and the quality of service on the connection over which the link is to be made. The meta-data are presented on the user's computer screen in a movable "Magic Lens" window, which is superimposed on the Web page that is currently displayed on the screen. The window for a given link opens when the user passes the cursor over an "anchor" (such as a hot button) corresponding to the link.

U.S. Pat. No. 5,708,825, which is incorporated herein by reference, describes a method and apparatus to enable scanning one or more documents, automatically identifying significant key topics, concepts and phrases in the documents, and creating summary pages for, and hyperlinks between, some or all of these key topics.

All of these inventions are used to create additional hyperlinks in a displayed document or to modify the hyperlink appearance, but none of them allow the user to remove or control the visual clutter caused by too many hyperlinks in a document.

SUMMARY OF THE INVENTION

Preferred embodiments of the present invention provide methods and tools that enable both the content provider and the content consumer to control the "verbosity" of hyperlinks on a Web page, i.e., to control the numbers and types of links that appear on the page, according to context, situation, and individual preference. Preferably, these embodiments provide visual information about the media type of the link, content type, source and/or availability. This information can be used to disable some or all of the hyperlinks on a page of a particular type, based on user preference, system owner policy, or system capabilities.

In preferred embodiments of the present invention, a Web page (or other markup language document) contains hyperlinks, which are identified as to their type, or category, in the markup language code. Preferably, some or all of the hyperlinks also carry a ranking attribute, which is preferably indicative of a likelihood that a viewer of the page will want to see and use the links. This ranking attribute is referred to herein as a verbosity characteristic. These annotations of the hyperlinks may be added by an author of the page, or added automatically by a suitable computer program, or both.

In order to take advantage of the annotation of the hyperlinks, a Web browser is enhanced so as to enable the viewer to choose levels of verbosity. The enhancement may be built into the browser, or it may be added to a standard browser as a plug-in, as is known in the art. The browser provides user controls, which allow the user to choose to view each of the different types of hyperlinks at a respective level of verbosity, i.e., to view a greater or smaller number of the hyperlinks of each type (or to view none of the hyperlinks of a given type), depending on their ranking. The user controls typically comprise standard user interface elements, such as radio buttons or sliders. Alternatively or additionally, the user environment (for example, company policy, parental supervision, or user hardware capabilities) may set other preferences.

The type and ranking attributes and the user preferences are processed by the browser, which displays the Web page in the browser viewer window with the selected level of hyperlink verbosity for each of the hyperlink types. The output is displayed preferably without substantially changing the original content design. Most preferably, the user can operate the browser controls while the browser is displaying a given Web page, thereby adding to the window links of a desired type, or removing links so as to reduce visual clutter.

In a preferred embodiment of the present invention, the content author specifies the hyperlinks using the Xlink constructs described in the background. In another preferred embodiment, the content author specifies formatting of the hyperlinks in the Web page based on style sheets external to the content itself. The Xlink tags or style sheets allow the author to specify formatting commands separately from the content itself. Each hyperlink type and verbosity characteristic (i.e., ranking) is preferably represented as a different style name. The tags or style sheet determines the manner of presentation of the content, and uses the built-in ability of current Web browsers to modify content appearance based on such style sheets by dynamically merging the style sheet with the original content. Another possible embodiment includes modifying the original HTML code for the Web page to incorporate the hyperlink formatting according to the current verbosity settings.

There is therefore provided, in accordance with a preferred embodiment of the present invention, a method for visualizing data, including:

receiving code representing content to be presented to the user, the content including a plurality of hyperlinks to other content and at least one attribute associated with each of the hyperlinks;

receiving a set of at least one user preference for displaying the hyperlinks responsive to the at least one attribute associated therewith; and displaying the content while hiding at least one of the hyperlinks responsive to the at least one user preference and to the at least one attribute associated with the at least one of the hyperlinks.

Preferably, the at least one attribute includes a verbosity characteristic, and the at least one user preference specifies a desired level of verbosity, and displaying the content includes selecting the at least one of the hyperlinks to hide responsive to a comparison of the verbosity characteristic thereof and the verbosity level. Most preferably, the verbosity level includes a verbosity threshold, and selecting the at least one of the hyperlinks includes hiding those hyperlinks whose verbosity characteristic is above the threshold. Further preferably, receiving the set of at least one user preference includes servicing an interaction by the user with an on-screen control for setting the verbosity level. Additionally or alternatively, the at least one attribute includes a classification of the hyperlink into one of a plurality of predefined categories, and wherein receiving the set of at least one user preference includes receiving the desired level of the verbosity by category.

Preferably, the at least one attribute includes a classification of the hyperlink into one of a plurality of predefined categories, and receiving the set of at least one user preference includes receiving the user preference with regard to displaying each of the categories. Typically, the hyperlinks includes two or more hyperlinks in different ones of the categories associated with a single item in the content, and displaying the content includes determining which of the two or more hyperlinks to display responsive to the user preference.

Preferably, the content includes markup language code, wherein the at least one attribute is determined by a style sheet associated with the content, and wherein displaying the content includes formatting the content for display responsive to the style sheet.

In a preferred embodiment, receiving the set of at least one user preference includes receiving an input of the preference while the content is being displayed, and displaying the content includes altering the content displayed based on the input of the preference.

In a further preferred embodiment, displaying the content includes using a Web browser program to generate the display, and setting the at least one user preference includes positioning a cursor on a screen and moving the cursor so as to interact with a user interface displayed by the browser program. Preferably, the user interface includes slider controls.

There is also provided, in accordance with a preferred embodiment of the present invention, apparatus for visualizing data, including:

a computer which is arranged to receive code representing content for display on a monitor screen, the content including a plurality of hyperlinks to other content and at least one attribute associated with each of the hyperlinks, the computer being further arranged to receive a set of at least one user preference for displaying the hyperlinks responsive to the at least one attribute associated therewith; and a display, coupled to be driven by the computer to display the content while at least one of the hyperlinks is hidden responsive to the at least one user preference and the at least one attribute associated with the at least one of the hyperlinks.

Preferably, the apparatus includes a user input device, which is coupled to the computer so as to enable the user to set the verbosity level by interacting with controls shown on the display.

There is additionally provided, in accordance with a preferred embodiment of the present invention, a computer software product for visualizing data, including a computer-readable medium in which program instructions are stored, which instructions, when read by a computer, cause the computer to receive code representing content to be presented to the user, the content including a plurality of hyperlinks to other content and at least one attribute associated with each of the hyperlinks, and which instructions further cause the computer to receive a set of at least one user preference for displaying the hyperlinks responsive to the at least one attribute associated therewith, and which instructions further cause the computer to display the content while hiding at least one of the hyperlinks responsive to the at least one user preference and to the at least one attribute associated with the at least one of the hyperlinks.

The present invention will be more fully understood from the following detailed description of the preferred embodiments thereof, taken together with the drawings in which:

DETAILED DESCRIPTION OF PREFERRED EMBODIMENTS

Figure 1:
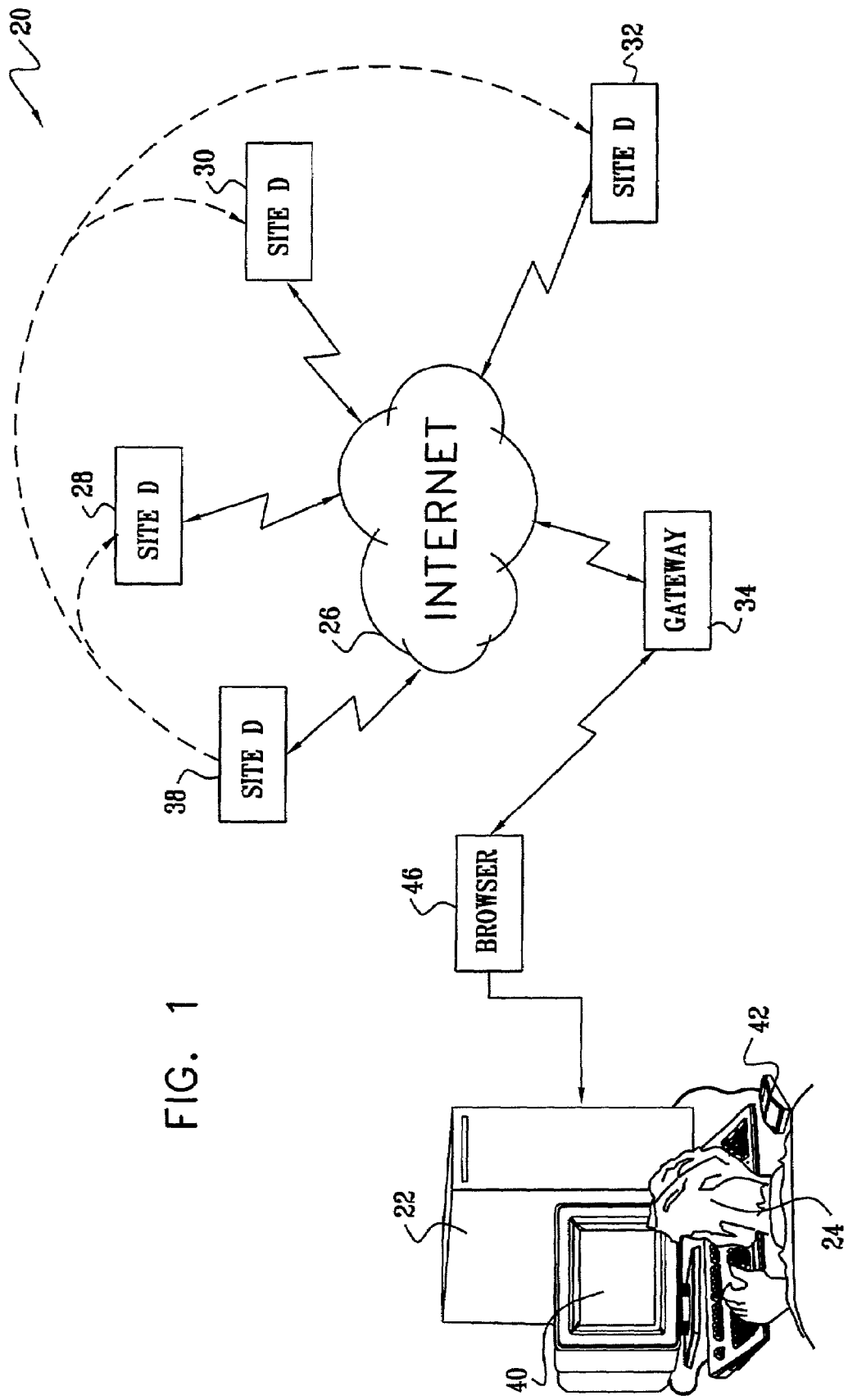
FIG. 1 is a block diagram that schematically illustrates a system of linked resources accessed by a user via a network, in accordance with a preferred embodiment of the present invention.

FIG. 1 is a block diagram that schematically illustrates a system 20 of linked resources accessed by a user 24 via a network 26, in accordance with a preferred embodiment of the present invention. Preferably, network 26 comprises the Internet, and the resources are available, inter alia, at various Web sites 28, 30, 32, 38 which are linked by hyperlinks on certain Web pages, as is known in the art. User 24 accesses the Web sites and hyperlinks using a personal computer 22, equipped with a suitable Web browser program 46. Computer 22 is typically connected to the network through a dial-up link, local area network or other connection to a gateway 34. The user views the Web pages using the browser program on a display 40 and selects the hyperlinks appearing on the pages using a pointing device, such as a mouse 42.

Figure 2A:
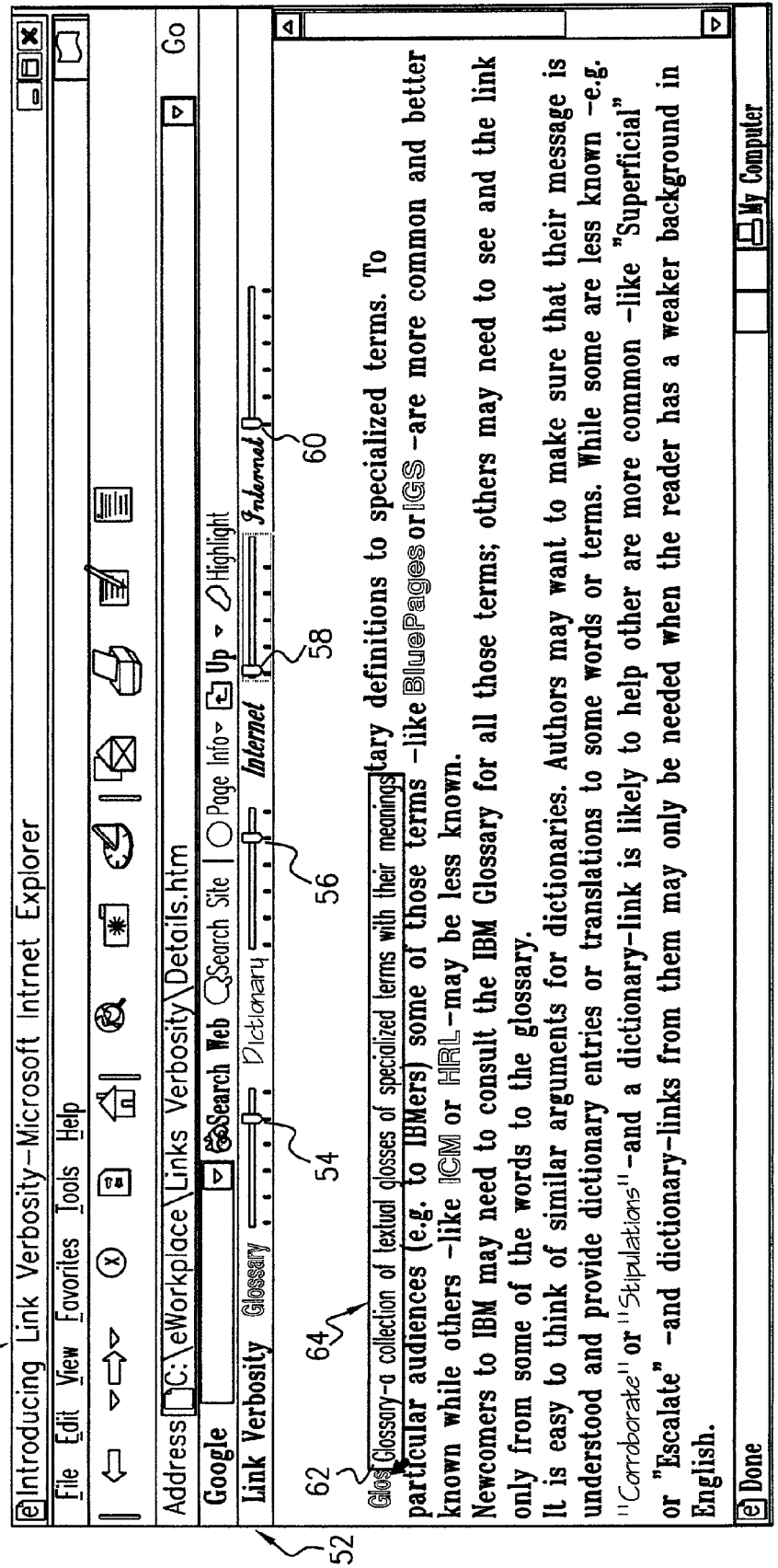
FIGS. 2A, and 2B are schematic representations of computer screens viewed by the user of FIG. 1, in accordance with a preferred embodiment of the present invention.
Figure 2B:
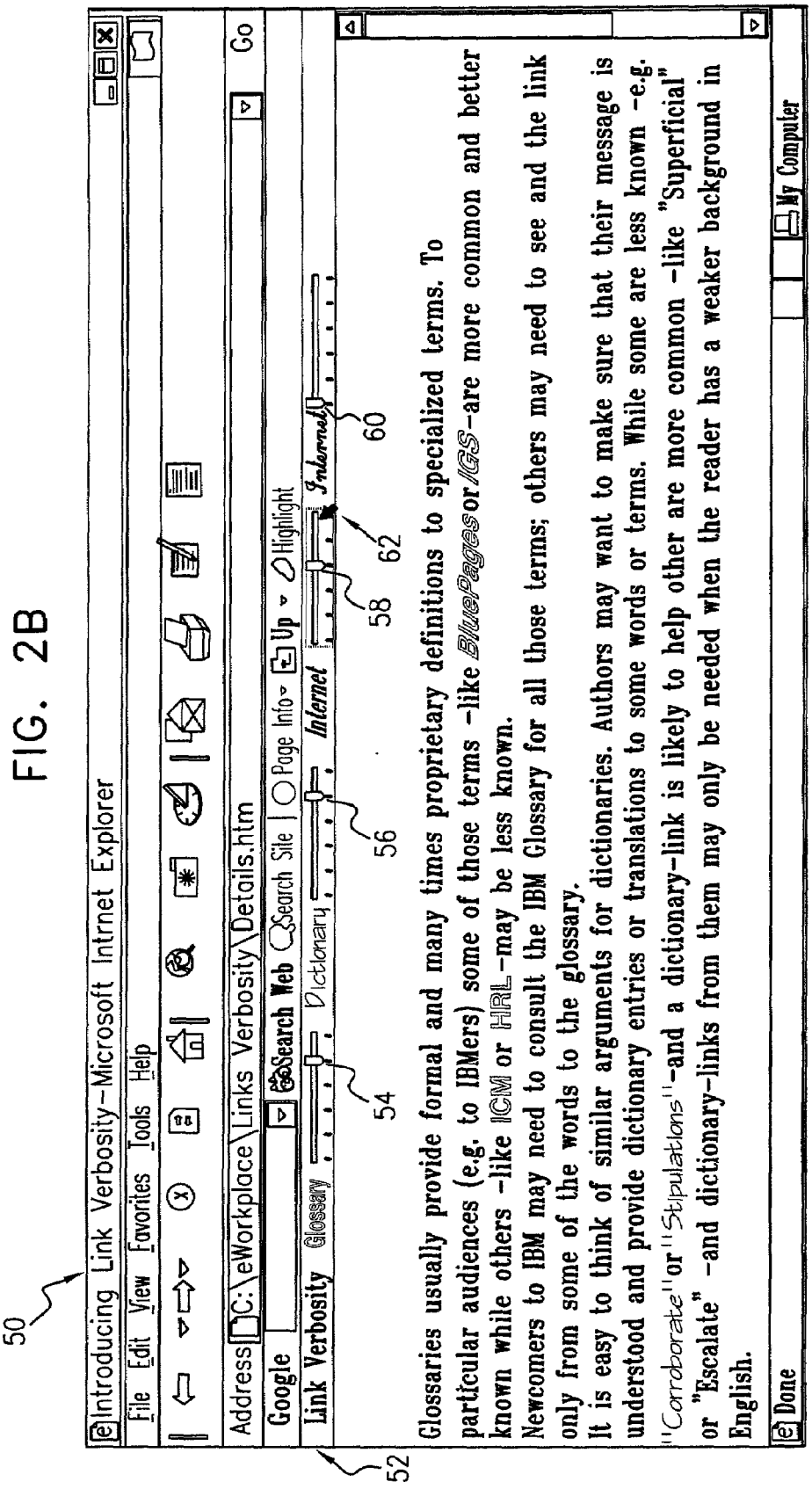

FIGS. 2A and 2B are schematic representations of a browser window 50 viewed by user 24 on display 40, in accordance with a preferred embodiment of the present invention. Browser window 50 in both figures is displaying the same document. The browser window, in addition, displays a set of link verbosity sliders in a verbosity toolbar 52. Four different sliders are defined: a glossary slider 54, a dictionary slider 56, an intranet slider 58 and an Internet slider 60. Glossary slider 54 and hyperlinks of the glossary type are formatted in hollow type. Dictionary slider 56 and hyperlinks of the dictionary type are formatted in script type. Intranet slider 58 and hyperlinks of the intranet type are formatted in italics. Internet slider 60 and hyperlinks of the Internet type are formatted in cursive type. In this embodiment of the invention, no use of color as a formatting element was allowed due to restrictions on the use of color in patent application figures. Preferably, color is used as well to distinguish between exclusive types.

In the example shown in FIG. 2A, the user has placed a cursor 62 over the word Glossary, and as a consequence a pop-up window 64 is open. Window 64 illustrates the operation of dictionary hyperlinks. Note that the same effect would occur if the user placed the cursor over any of the words that are formatted in script type: corroborate and stipulations. Other words are formatted in hollow type to indicate that they are glossary hyperlinks: BluePages, IGS, ICM and HRL. The dictionary and glossary hyperlinks are shown in window 50 in FIG. 2A because the respective sliders are set to relatively high values, allowing a certain degree of "verbosity" in displaying such hyperlinks. On the other hand, the intranet and Internet sliders are set to their minimum values, and these types of hyperlinks therefore do not appear in the window.

In FIG. 2B, intranet slider 54 is set at a higher level than in FIG. 2A. As a consequence, the terms BluePages and IGS are shown now in hollow italics in FIG. 2B, indicating that they are both a glossary type link (since they are set in hollow type) and an intranet type of link (since they are italicized).

Also note that the words escalate and superficial are not shown as dictionary type terms in FIG. 2A or 2B. Since the user has set the dictionary slider below the maximum level, some relatively well-known words, such as escalate and superficial, with a higher verbosity characteristic for the dictionary, are not displayed as dictionary terms. In other words, the lower the verbosity characteristic associated with a hyperlink, the likelier it is (in the judgment of the person or automatic tool that prepared and annotated the hyperlinks) that a viewer of window 50 will wish to see the hyperlink. As the viewer moves the slider of a particular type to a higher level, the verbosity of the hyperlinks of that type that appear in windown 50 increases (so that the number of hyperlinks appearing in the window increases, as well).

As noted above, an element in a document may have multiple hyperlinks of different types, each with its own verbosity characteristic. In the case of "BluePages" and "IGS" in FIG. 2B, there is no conflict between the hyperlinks, as the formatting styles are orthogonal. When the formatting styles conflict (as when different colors are used for different hyperlink types, for example), the document is preferably reformatted in order to resolve the conflict. Preferably, a distance function is computed, based on the difference between the verbosity characteristic of each of the conflicting hyperlinks and the verbosity cutoff level set by the user for the corresponding style. The hyperlink with the largest value of the distance function is then displayed. Other criteria may also be used, particularly for resolving situations in which the distance function values of two conflicting hyperlinks are equal.

Figure 3:
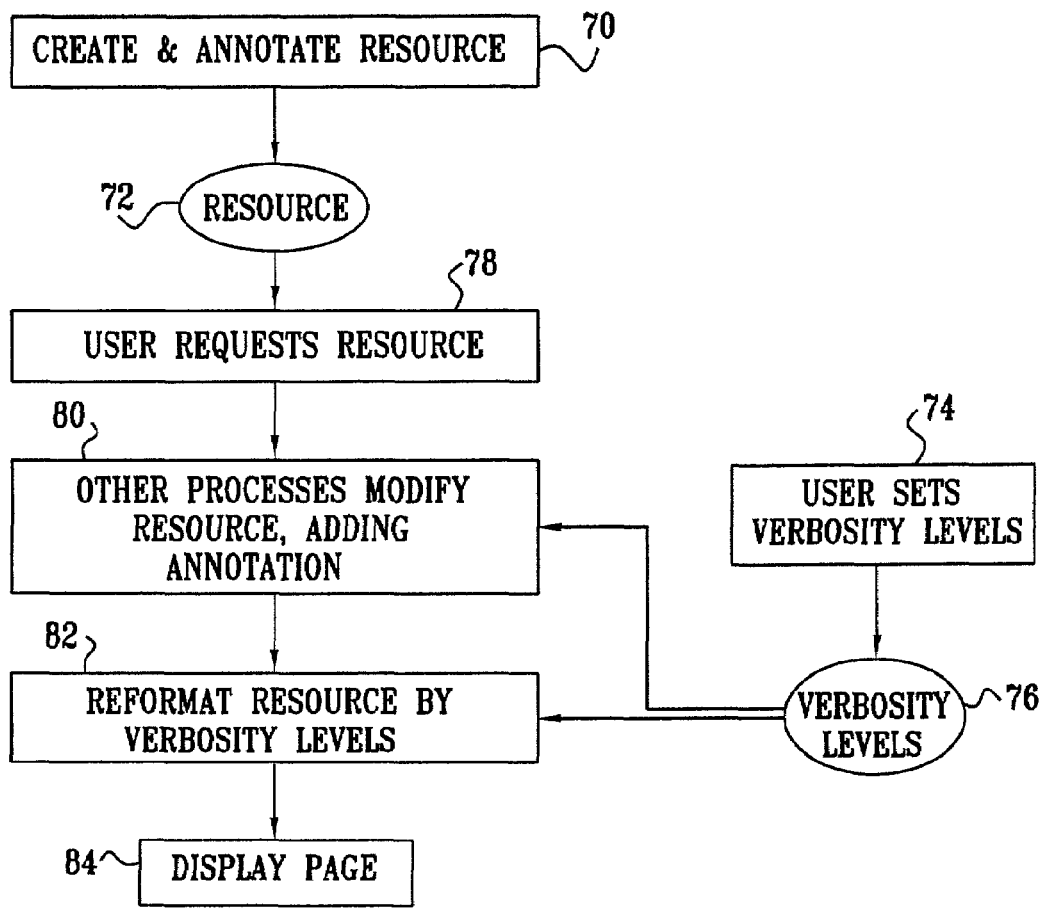
FIG. 3 is a flow chart that schematically illustrates a method for displaying content with controlled verbosity of hyperlinks, in accordance with a preferred embodiment of the present invention.

FIG. 3 is a flow chart that schematically illustrates a method for displaying content with variable hyperlink verbosity, in accordance with a preferred embodiment of the present invention. The steps of the method are carried out by suitable software running on computer 22, possibly in cooperation with other computers, such as servers at Web sites 28, 30, 32 or gateway 34, or servers elsewhere on network 26. The software may be supplied to the appropriate computers in electronic form, by downloading over a network, or it may alternatively be supplied on tangible media, such as CD-ROM or non-volatile memory.

An author creates a document, and annotates the document with hyperlinks, at an annotation step 70. The annotations can be added manually by the author or, alternatively or additionally, by tools such as RichLink, as specified in the Background of the Invention. Each of the hyperlinks is preferably annotated with a specified category (such as Dictionary, Glossary, etc., as shown in FIGS. 2A and 2B), and a specified verbosity characteristic. The categories and verbosity characteristics may by specified by the author, or they may be added by the automatic tools used to create the added annotations.

The annotated document is stored as a set of resources 72 in a location available for download to a user. Preferably the document is stored in a markup language, such as HTML, utilizing external style sheets to specify the formatting of the hyperlinks.

An exemplary portion of such a HTML document appears below:

The painter <span id="a1">Picasso</span> was born in <span id="a2">Spain</span>

The span tag is a placeholder for any valid type of markup language tag, including anchor, div, and img tags. The importance of the tag for the preferred embodiments of the present invention is the "id" attribute. The effect of the document portion above is to assign the attribute "a1" to the text "Picasso" and the attribute "a2" to the text "Spain".

Resources 72 contain a style sheet defining the ids as follows:

<link from="a1" type="Internet" verbosity="2" to="http://www.painters.com#Picassso"/>
<link from="a1" type="Glossary" verbosity="4" to="Pablo Picasso, 1898 (Spain)-1987 (France)"/>
<link from="a1" type="Internet" verbosity="5" to="http://www.yahoo.com/search.cgi?word=Picasso+Pab lo"/>

Each link tag expands the meaning of the id. In this case, the "a1" id is qualified with two Internet type attributes, each with a different verbosity characteristic. The "a1" id is further qualified with a Glossary type attribute, which carries the verbosity characteristic 4.

A user preparing to view the document sets verbosity levels 76 for different types of information in the document, at a verbosity setting step 74. The levels thus set become the verbosity cutoff levels. A hyperlink with a verbosity characteristic above the cutoff level will be hidden from the user. Typically, the user operates on-screen controls, such as those shown in FIGS. 2A and 2B, for this purpose. Preferably, the controls are incorporated into browser software 46, either as a component of the original browser package or as a part of a downloadable plug-in. The verbosity levels are stored in temporary memory at step 74. In the example shown above, the user has manipulated the sliders to set the verbosity levels of types "Internet" and "Glossary." The user then requests to view the document, at a document request step 78.

In response to the user request, resources 72 are downloaded from the location at which they are stored (such as Web sites 28, 30, 32) to computer 22. Optionally, additional links and annotations may be automatically added to the document and its associated resources, at an automated annotation addition step 80. For instance, complicated terms that appear in the resource may be automatically linked to a user's private dictionary, or acronyms may be automatically linked to explanatory glossary information. Automatic tools, such as Web Browser Intelligence, "Link Lens", or the method of U.S. Pat. No. 5,708,825, as described in the Background of the Invention, may also be used to annotate the downloaded resources.

At a reformatting step 82, the hyperlink verbosity characteristics of the hyperlinks in resource 72 are matched with verbosity levels 76 set by the user. Any hyperlinks with verbosity characteristics above the cutoff for that type of hyperlink are reformatted as normal text. The reformatting step provides output in a format ready for display by browser program 46 on computer 22. The browser then displays the reformatted markup language document in browser window 50, as shown in FIGS. 2A and 2B, in a display step 84.

Verbosity setting step 74 and resource request step 78 are independent. Either a change in the verbosity levels 78 or a request to view a resource trigger automatic annotation step 80 and subsequent reformatting step 82 and display step 84. The user is thus free to change verbosity levels while viewing a resource, and the display of the resource in window 50 will be modified accordingly.

In another preferred embodiment of the present invention, resources 72 comprise a XML document, along with a corresponding XLS style sheet. The style sheet contains formatting information for each element in the XML document. Preferably, hyperlinks are inserted in the XML document using the Xlink standard, as described in the Background of the Invention. Each hyperlink includes a tag indicating its type and verbosity characteristic. A process invoked by reformatting step 82 scans the XML document. Each XML element is translated into the desired output format (such as HTML) using the formatting information contained in the XLS style sheet. The hyperlinks in the XML document are displayed in substantially the manner described above.

Although preferred embodiments are described herein with reference to "documents," it will be appreciated that the term "document" as used herein is not limited strictly to text files. The principles of the present invention can be applied to images, video and sound resources. Furthermore, although preferred embodiments are described with reference to system 20, based on personal computer 22, as shown in FIG. 1, the principles of the present invention may be applied to substantially any apparatus that can be used to relay and display hyperlinked resources to a user, including devices such as cellular phones and personal data assistants.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for visualizing data, comprising:
   receiving code representing content prepared by an author, the code comprising a plurality of hyperlinks and at least one attribute associated with each of the hyperlinks;
   receiving from a viewer of the content other than the author at least one user preference for displaying the hyperlinks; and
   displaying the content while hiding at least one, but not all, of the hyperlinks responsive to the at least one user preference and to the at least one attribute associated with the at least one of the hyperlinks.

2. A method according to claim 1, wherein the at least one attribute comprises a verbosity characteristic, and wherein the at least one user preference specifies a desired level of verbosity, and wherein displaying the content comprises selecting the at least one of the hyperlinks to hide responsive to a comparison of the verbosity characteristic thereof and the verbosity level.

3. A method according to claim 2, wherein the verbosity level comprises a verbosity threshold, and wherein selecting the at least one of the hyperlinks comprises hiding those hyperlinks whose verbosity characteristic is above the threshold.

4. A method according to claim 2, wherein receiving the at least one user preference comprises servicing an interaction by the viewer with an on-screen control for setting the verbosity level.

5. A method according to claim 2, wherein the at least one attribute comprises a classification of the hyperlink into one of a plurality of predefined categories, and wherein receiving the at least one user preference comprises receiving the desired level of the verbosity by category.

6. A method according to claim 1, wherein the at least one attribute comprises a classification of the hyperlink into one of a plurality of predefined categories, and wherein receiving the at least one user preference comprises receiving the at least one user preference with regard to displaying each of the categories.

7. A method according to claim 6, wherein the hyperlinks comprises two or more hyperlinks in different ones of the categories associated with a single item in the content, and wherein displaying the content comprises determining which of the two or more hyperlinks to display responsive to the user preference.

8. A method according to claim 1, wherein the content comprises markup language code.

9. A method according to claim 8, wherein the at least one attribute is determined by a style sheet associated with the content, and wherein displaying the content comprises formatting the content for display responsive to the style sheet.

10. A method according to claim 1, wherein receiving the at least one user preference comprises receiving an input of the preference while the content is being displayed, and wherein displaying the content comprises altering the content displayed based on the input of the preference.

11. A method according to claim 1, wherein displaying the content comprises using a Web browser program to generate the display, and wherein receiving the at least one user preference comprises positioning a cursor on a screen and moving the cursor so as to interact with a user interface displayed by the browser program.

12. A method according to claim 11, wherein the user interface comprises slider controls.

13. Apparatus for visualizing data, comprising:
a computer which is arranged to receive code representing content prepared by an author for display on a monitor screen, the content comprising a plurality of hyperlinks and at least one attribute associated with each of the hyperlinks, the computer being further arranged to receive from a viewer of the content other than the author at least one user preference for displaying the hyperlinks; and
a display, coupled to be driven by the computer to display the content while at least one, but not all, of the hyperlinks is hidden responsive to the at least one user preference and the at least one attribute associated with the at least one of the hyperlinks.

14. Apparatus according to claim 13, wherein the at least one attribute comprises a verbosity characteristic, and wherein the at least one user preference specifies a desired level of verbosity, and wherein the computer is arranged to select the at least one of the hyperlinks to hide responsive to a comparison of the verbosity characteristic of the hyperlink and the verbosity level.

15. Apparatus according to claim 14, wherein the verbosity level comprises a verbosity threshold, and wherein the computer is arranged to hide those hyperlinks whose verbosity characteristic is above the threshold.

16. Apparatus according to claim 14, and comprising a user input device, which is coupled to the computer so as to enable the viewer to set the verbosity level by interacting with controls shown on the display.

17. Apparatus according to claim 14, wherein the at least one attribute comprises a classification of the hyperlink into one of a plurality of predefined categories, and wherein the at least one user preference comprises a specification of the desired level of verbosity by category.

18. Apparatus according to claim 13, wherein the at least one attribute comprises a classification of the hyperlink into one of a plurality of predefined categories, and wherein the at least one user preference comprises a respective preference with regard to each of the categories.

19. Apparatus according to claim 18 wherein the hyperlinks comprise two or more hyperlinks in different ones of the categories associated with a single item in the content, and wherein the computer is arranged to determine which of the two or more hyperlinks to display responsive to the user preference.

20. Apparatus according to claim 13, wherein the content comprises markup language code.

21. Apparatus according to claim 20, wherein the at least one attribute is determined by a style sheet associated with the content, and wherein the computer is arranged to format the content for display responsive to the style sheet.

22. Apparatus according to claim 13, wherein the computer is arranged to receive an input of the at least one user preference while the content is being displayed, and to alter the content displayed based on the input of the preference.

23. Apparatus according to claim 13, wherein the computer is arranged to use a Web browser program to generate the display, and comprising a user input device operable by the viewer to position a cursor on the screen so as to interact with a user interface displayed within the browser software in order to set the at least one user preference.

24. Apparatus according to claim 23, wherein the user interface comprises slider controls.

25. A computer software product for visualizing data, comprising a computer-readable medium in which program instructions are stored, which instructions, when read by a computer, cause the computer to receive code representing content prepared by an author to be presented to a viewer of the content other than the author, the content comprising a plurality of hyperlinks to and at least one attribute associated with each of the hyperlinks, and
which instructions further cause the computer to receive at least one user preference for displaying the hyperlinks, and
which instructions further cause the computer to display the content while hiding at least one, but not all, of the hyperlinks responsive to the at least one user preference and to the at least one attribute associated with the at least one of the hyperlinks.

26. A product according to claim 25, wherein the at least one attribute comprises a verbosity characteristic, and wherein the at least one user preference specifies a desired level of verbosity, and wherein the instructions cause the computer to select the at least one of the hyperlinks to hide responsive to a comparison of the verbosity characteristic thereof and the verbosity level.

27. A product according to claim 26, wherein the verbosity level comprises a verbosity threshold, and wherein the instructions cause the computer to hide those hyperlinks whose verbosity characteristic is above the threshold.

28. A product according to claim 26, wherein the instructions cause the computer to interact with the user via an on-screen control for setting the verbosity level.

29. A product according to claim 26, wherein the at least one attribute comprises a classification of the hyperlink into one of a plurality of predefined categories, and wherein receiving the at least one user preference comprises a specification of the desired level of the verbosity by category.

30. A product according to claim 25, wherein the at least one attribute comprises a classification of the hyperlinks into one of a plurality of predefined categories, and wherein the at least one user preference comprises a respective preference with regard to each of the categories.

31. A product according to claim 30, wherein the hyperlinks comprise two or more hyperlinks in different ones of the categories associated with a single item in the content, and wherein the instructions cause the computer to determine which of the two or more hyperlinks to display responsive to the user preference.

32. A product according to claim 25, wherein the content comprises markup language code.

33. A product according to claim 32, wherein the at least one attribute is determined by a style sheet associated with the content, and wherein the instructions cause the computer to format the content for display responsive to the style sheet.

34. A product according to claim 25, wherein the instructions cause the computer to receive an input of the preference while content is being displayed, and to alter the content displayed based on the input of the preference.

35. A product according to claim 25, wherein the product comprises a Web browser program, which causes the computer to generate the display, and wherein the instructions cause the computer to position a cursor on a screen and to move the cursor in interaction with a user interface displayed by the browser program.

36. A product according to claim 35, wherein the user interface comprises slider controls.

* * * * *